United States Patent
Murakami et al.

(10) Patent No.: US 8,508,647 B2
(45) Date of Patent: Aug. 13, 2013

(54) SECURE MODULE CONNECTOR

(75) Inventors: Tetsuro Murakami, Tokyo (JP); Atsushi Nishio, Tokyo (JP); Soichi Takagi, Tokyo (JP)

(73) Assignee: Mitsumi Electric, Co., Ltd., Tokyo (JP)

( * ) Notice: Subject to any disclaimer, the term of this patent is extended or adjusted under 35 U.S.C. 154(b) by 538 days.

(21) Appl. No.: 12/588,308

(22) Filed: Oct. 9, 2009

(65) Prior Publication Data

US 2010/0091179 A1    Apr. 15, 2010

(30) Foreign Application Priority Data

Oct. 10, 2008  (JP) ................................. 2008-264538

(51) Int. Cl.
*H04N 5/225*  (2006.01)

(52) U.S. Cl.
USPC .......................................... 348/340; 348/374

(58) Field of Classification Search
USPC ................. 348/373, 374, 335, 340; 439/188, 439/331, 70
See application file for complete search history.

(56) References Cited

U.S. PATENT DOCUMENTS

| | | | |
|---|---|---|---|
| 6,435,882 B1 * | 8/2002 | Pitou | 439/70 |
| 2006/0063399 A1 * | 3/2006 | Li | 439/70 |
| 2007/0207653 A1 * | 9/2007 | Ono et al. | 439/188 |
| 2008/0119080 A1 * | 5/2008 | Wu | 439/331 |

FOREIGN PATENT DOCUMENTS

| | | |
|---|---|---|
| JP | 2005-268020 A | 9/2005 |
| JP | 2006-067443 | 3/2006 |
| JP | 2008-243459 A | 10/2008 |

* cited by examiner

*Primary Examiner* — Nelson D. Hernández Hernández
(74) *Attorney, Agent, or Firm* — Washida & Assocaites

(57) ABSTRACT

The module connector can accommodate a miniaturized module such as a camera module and reliably fix the module in an electrically connected state, and make the connector itself in lower profile. With this connector (100), a housing (110) has a concave container (110a) that accommodates an inserted camera module (200) in which a plurality of pads are disposed its bottom face. A contact (130) has: an arm (131) that projects from the bottom face of the container (110a) to the interior of the container (110a) and that elastically deforms; and, at the tip of the arm (131), a contact point part (133) that is swingable in the insertion direction of the camera module (200) by means of elastic deformation of the arm (131) and that contacts a pad. A shield cover (120) is attached to the housing (110) detachably covering the accommodating part (110a) and abuts on an upper face (211) of the camera module (200) urged in a direction opposite to the insertion direction by the arms (131) of the contacts (130), to sandwich the camera module (200) in combination with the contacts (130).

5 Claims, 5 Drawing Sheets

SECURE MODULE CONNECTOR

CROSS REFERENCE TO RELATED APPLICATIONS

The present application claims the benefit of Japanese Patent Application No. 2008-264538, filed on Oct. 10, 2008, the disclosure of which including the specification, drawings and abstract, is incorporated herein by reference in its entirety.

TECHNICAL FIELD

The present invention relates to a module connector to which a module such as a camera module with a solid state image sensor is connected.

BACKGROUND ART

Conventionally, as disclosed in, for example, Patent Literature 1, a connector that connects with a module, which is an electronic component such as a camera module, has spring hooks projecting in the interior of the container accommodating the module, to prevent the module in the container from falling.

FIG. 1 and FIG. 2 illustrate a conventional connector. FIG. 1 is a schematic longitudinal cross-sectional view showing a connector and a module mounted in the connector for illustrating the configuration of the conventional connector. FIG. 2 is a schematic cross-sectional view showing a state where a module is attached to the connector shown in FIG. 1.

Connector 10 shown in FIG. 1 and FIG. 2 attaches built-in module 20 to the device.

First, module 20 attached to this connector 10 will be explained. Module 20 is a camera module mounted in, for example, mobile telephones, and has lens part 24 above module body 23, which is approximately a quadrilateral having substrate 21 provided in the bottom face. Further, near corner parts in module body 23, engaging parts 22 are formed by making a notch that continues from the middle to the upper face of module body 23. Further, substrate 21 has a plurality of contact pads (not shown) that connect with the contact segments of connector 10.

Connector 10 has: housing 12 that is open upward and that has container 11 building in module 20; contact segments (not shown) that electrically connect with contact pads of substrate 21 inside container 11; and spring hooks 13 that engage with engaging parts 22 of module 20.

Spring hooks 13 are flexible and extend in the interior of container 11 from shield cases 14 covering the outer peripheral surfaces of housing 12, and engage with engaging parts 22 of the module, which is accommodated in container 11, at free tip parts 13a of the tips, thereby preventing the module from falling.

Spring hooks 13 are each placed to incline from the upper end part of shield case 14 toward the center of bottom face 10a of container 11 through inside housing 12, and free tip parts 13a are each positioned inside the container.

By building module 20 in container 11 by pressing down module 20 from above connector 10 into container 11, spring hooks 13 are elastically deformed by being pressed downward by the bottom face of module 20 and escape outward.

Then, when module 20 is inserted to a predetermined position inside container 11, free tip parts 13a of spring hooks 13 are restored in the state where contact pads of the substrate are in contact with the contact segments, and engage with engaging faces 22a of engaging parts 22, that is, the upper face of module 20 (see FIG. 2). By this means, spring hooks 13 prevent module 20 attached to connector 10 from falling.

Further, when the camera module is removed, free tip parts 13a of spring hooks 13 slide pressing against the side faces of the camera module that moves in the removing direction, outside the positions where free tip parts 13a lock with engaging parts 22.

To prevent deformation of spring hooks 13 due to this slide and secure the restoring force of free tip parts 13a, spring hooks 13 are configured to have deforming parts of a predetermined length L, from the upper end of shield cases 14 to free tip parts 13a.

CITATION LIST

Patent Literature
PTL 1: Patent 2006-67443

SUMMARY OF INVENTION

Technical Problem

Recently, electronic devices are miniaturized including mobile telephones on which modules such as camera modules are mounted and, accompanying this, there is a demand to make module connectors itself in lower profile used in mounting in the module.

However, according to the configuration of a conventional module connector, to prevent deformation of spring hooks 13 when the module is removed and secure the restoring force of free tip parts 13a, it is necessary to secure the length L of deforming parts between the upper ends of shield cases 14 and free tip part 13a.

For this reason, the sidewall parts surrounding container 11 require a height L2 to ensure the length L of the deforming parts projecting from the upper end of the sidewall parts toward bottom face 10a of container 11, and therefore it was difficult to make module connectors in lower profile.

It is therefore an object of the present invention to provide a module connector that can accommodate a miniaturized module such as a camera module and reliably fix the module in an electrically connected state, and that can be made in lower profile.

Solution to Problem

To achieve the above object, the present invention employs a configuration which includes: a housing that has a concave container which accommodates a module that is inserted directing a bottom face to the housing in which a plurality of planar contact parts are disposed in the bottom face; a contact that provides a contact point part which contacts the planar contact part, with a tip of an arm part which is elastically deformable and projects toward the concave container from a bottom face of the concave container; and a shield cover that is attached detachably to the housing and that abuts on an upper face of the module urged in a direction opposite to an insertion direction by means of elastic deformation of the arm part of the contact, to sandwich the module in combination with the contact.

Advantageous Effects of Invention

The present invention can accommodate a miniaturized module such as a camera module and reliably fix the module in an electrically connected state, and can be made in lower profile.

DESCRIPTION OF EMBODIMENTS

Hereinafter, an embodiment of the present invention will be explained in detail with reference to the accompanying drawings.

Figure 3:
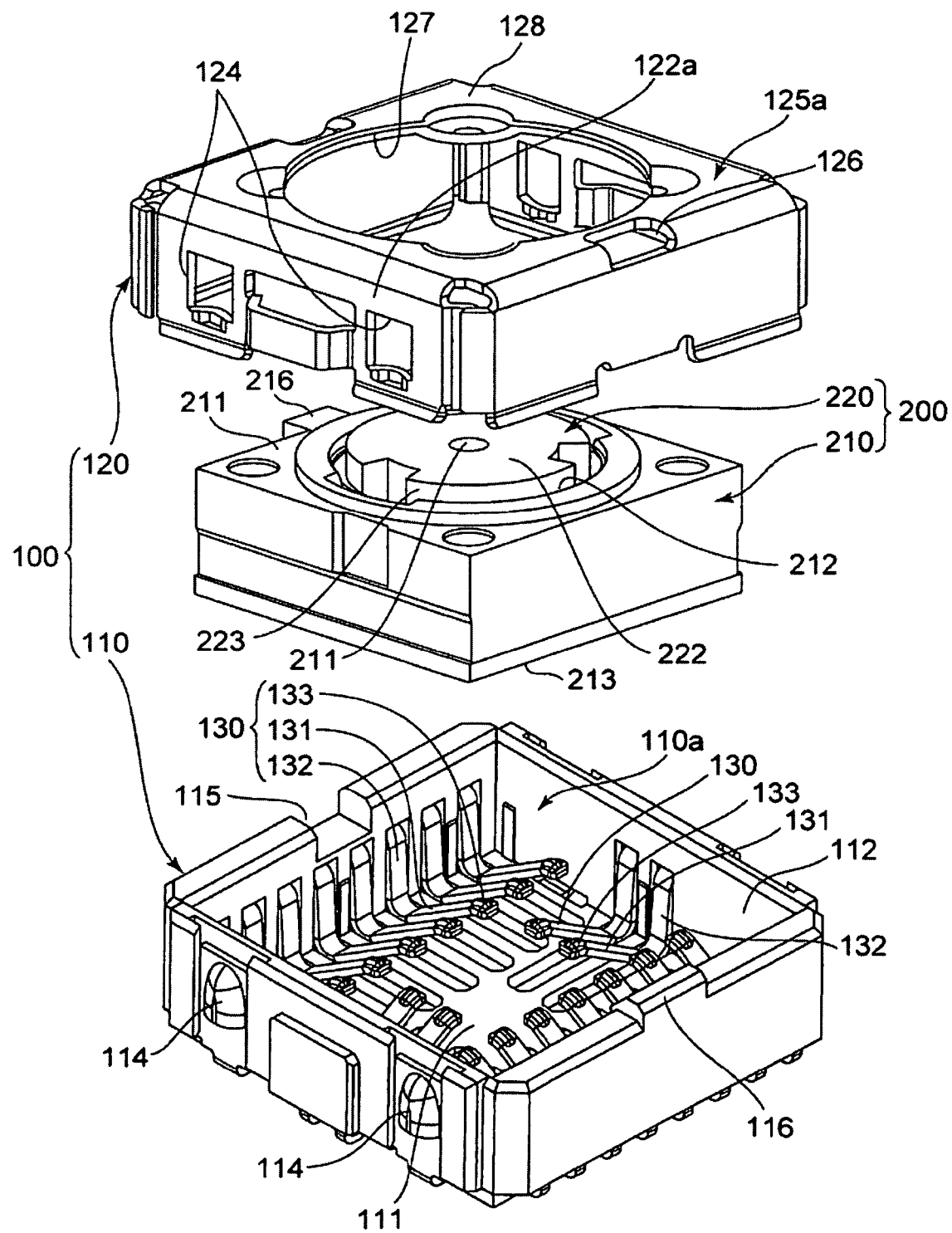
FIG. 3 illustrates a module connector according to an embodiment of the present invention.
Figure 4:
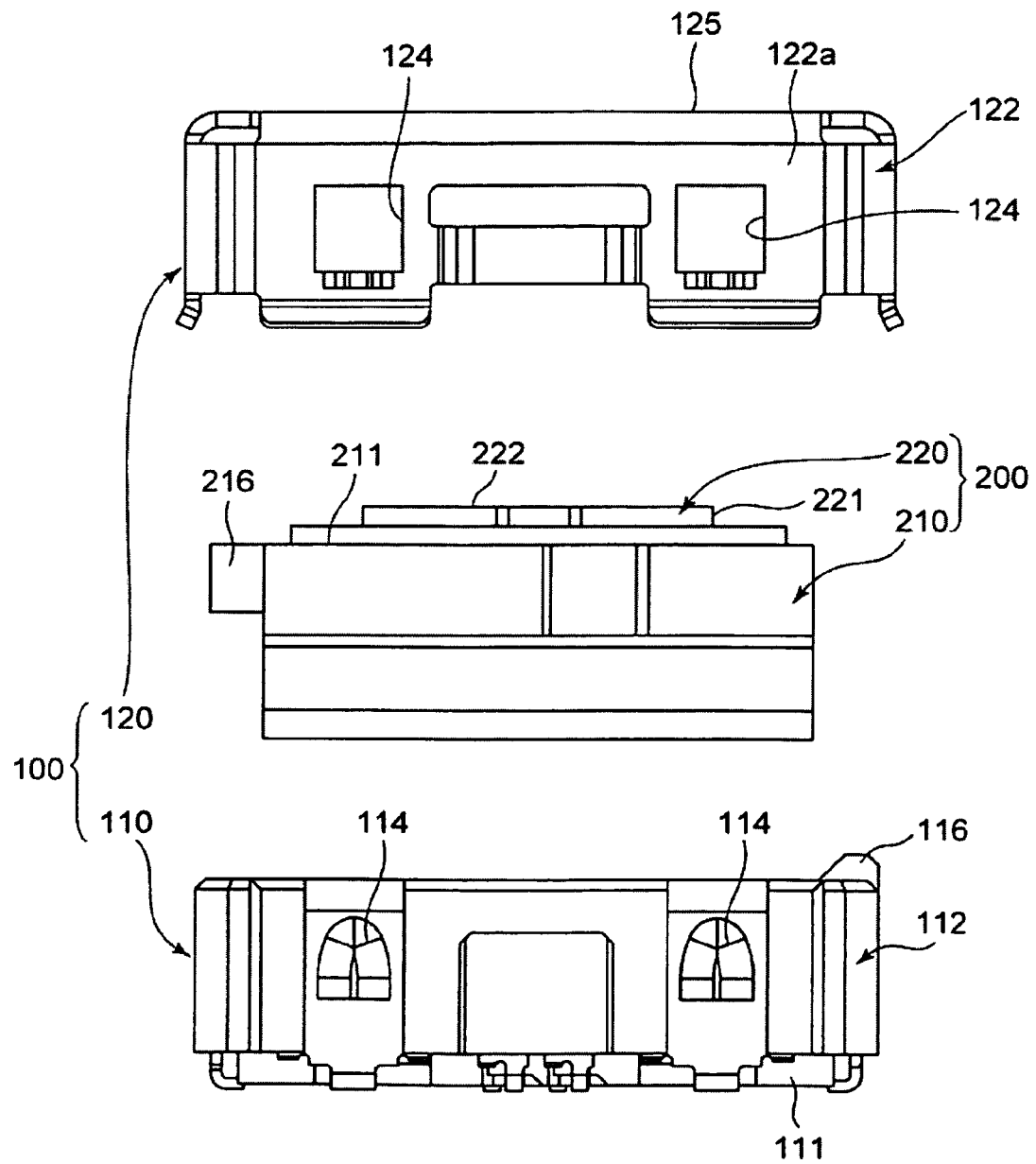
FIG. 4 illustrates the module connector according to an embodiment of the present invention.

FIG. 3 and FIG. 4 illustrate a module connector according to an embodiment of the present invention. FIG. 3 is a perspective view of a module connector and a camera module, and FIG. 4 is a side view of the module connector and the camera module. Further, with the present embodiment, although the module to attach to the module connector is a camera module, the present invention is not limited to this, and any module may be attached as long as the module is an electronic component (i.e. module) having a plurality of planar contact parts (hereinafter also referred to as "pads") in the bottom face.

Module connector (hereinafter "connector") 100 according to the present embodiment shown in FIG. 3 and FIG. 4 is used when camera module 200 is mounted on the substrate.

Connector 100 has: housing 110 in which a plurality of contacts 130 are disposed; and shield cover 120 which is attached detachably to cover housing 110 from above. Connector 100 arranges camera module 200 in housing 110, accommodates camera module 200 by covering camera module 200 with shield cover 120 and fixes camera module 200 in an electrically connected state.

First, camera module 200 that is accommodated in connector 100 will be explained. Camera module 200 that is mounted on the substrate through this connector 100 supports, for example, VGA (Video Graphics Array).

This camera module 200 has: module body 210 of a virtually rectangular parallelepiped shape; and cylindrical lens unit 220 that attaches inside a barrel a lens to guide light in the solid image sensor such as a CMOS camera module (not shown) arranged in module body 210.

Lens unit 220 is attached to module body 210 to allow upward and downward movement, assuming that upper face 222, in which imaging hole 221 is formed in the center, is provided facing the direction in which images are taken. By moving lens unit 220 toward module body 210, the distance between the lens arranged on the optical path in the imaging hole and the solid imaging sensor in module body 210, is adjusted. Lens unit 220 screws the male screw part formed in the outer periphery (the periphery of barrel 223), into the female screw part (not shown) formed in the rim part of opening part 212 that is open in upper face 211 of module body 210. By this means, lens unit 220 is attached allowing upward and downward movement with respect to module body 210.

Here, lens unit 220 is arranged in opening part 212 formed in virtually the center of upper face 211 of module body 210.

Further, in the bottom face of camera module 200, that is, in bottom face part 213 of module body 210, a plurality of pads (not shown) are provided along the peripheral part, and touch contacts 130 disposed in housing 110 of connector 100 when camera module 200 is accommodated in connector 100.

Figure 5:
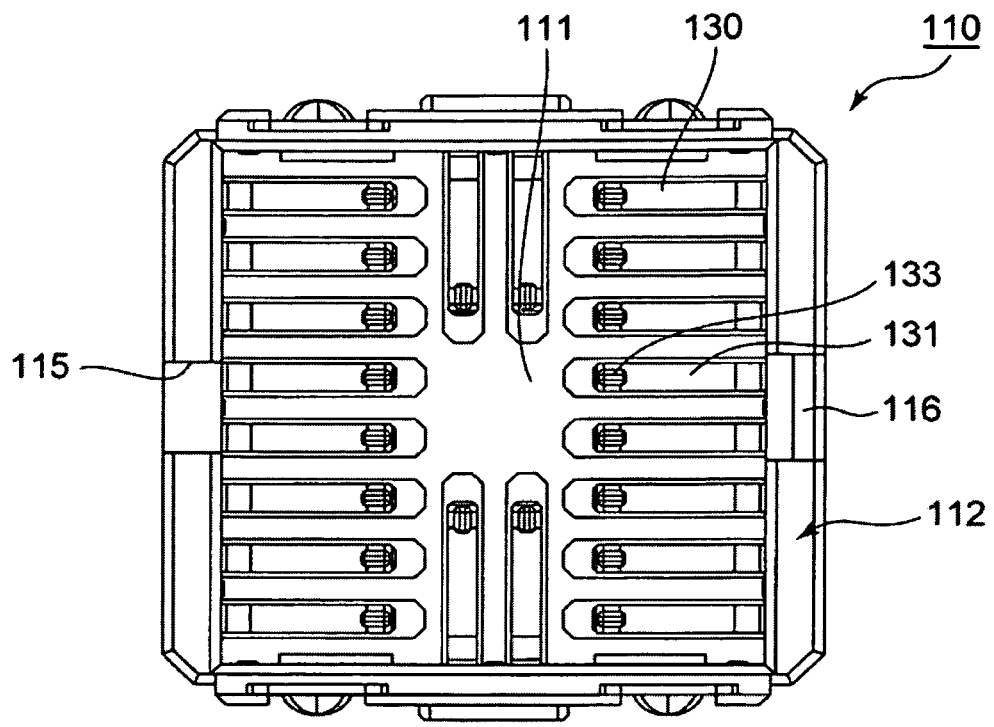
FIG. 5 is a top view showing a housing of a module connector according to the present embodiment.
Figure 6:
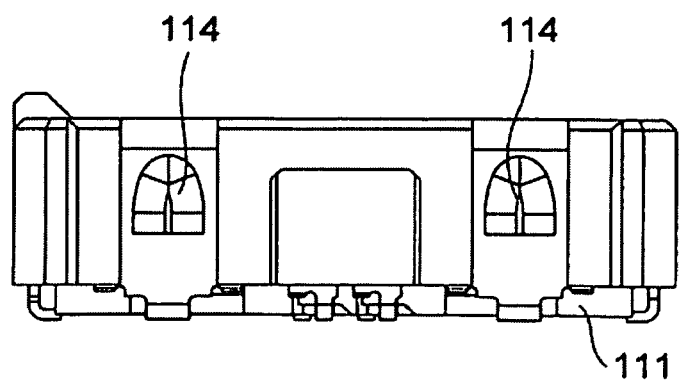
FIG. 6 is a back view of the housing of the module connector according to the present embodiment.

FIG. 5 is a top view of housing 110 in camera module connector 100 according to the present embodiment, and FIG. 6 is a back view of housing 110.

As shown in FIG. 3, FIG. 5 and FIG. 6, housing 110 is made of a resin, and has concave container (hereinafter "container") 110a, which is open on one surface side (here, the upper surface) and which accommodates camera module 200 from the opening side. Housing 110 has a rectangular box shape defining container 110a by rectangular bottom face part 111 and surrounding wall part 112 that rises from the outer rim of bottom face part 111. The opening shape of housing 110 matches the outer shape of module body 210 of camera module 200.

In the outer face of surrounding wall part 112 of housing 110, engaging projections 114 are formed that engage with attaching holes 124 of sidewall parts 122a of shield cover 120 when shield cover 120 is attached. Here, engaging projections 114 are formed in the outer faces of a pair of facing wall parts of surrounding wall part 112. Further, engaging projections 114 are formed by processing an electrically conductive metal plate. Here, in a pair of facing wall parts of surrounding wall part 112, engaging projections 114 are formed in metal plate members embedded face-to-face with the outer faces of these wall parts. That is, engaging projections 114 are formed by processing parts facing the outer faces of the wall parts in the metal plates such that these parts project.

Engaging projections 114 are tapered downward from above such that the tapers are spaced apart from the outer faces of the wall parts. By this means, when shield cover 120 is attached to housing 110 by covering housing 110, it is easy to attach engaging projections 114 to attaching holes 124 and it is difficult to remove engaging projections 114 from attaching holes 124 after the engagement.

In housing 110, arms 131 of a plurality of contacts 130 are disposed to project toward container 110a from bottom face part 111 that defines the bottom face of container 110a.

Contact 130 is formed by bending a thin, long, electrically conductive metal strip, thereby making arm 131 elastically deformable. By means of elastic deformation, arm 131 swings contact point part 133 formed at its tip, in directions approaching and moving away from bottom face part 111.

This arm 131 is bent upward, in the shape of the letter V, from the front end of extending part 132 that extends along the inner wall face of surrounding wall part 112 from the upper end part (i.e. the end part on the opening side) to the lower end side (on the bottom face part 111 side). By this means, arm 131 is arranged to project inclining upward from the lower end of surrounding wall part 112 toward the interior of container 110a, and is elastically deformable in the downward direction (i.e. the insertion direction of camera module 200 to container 110a). That is, arm 131 is elastically deformable, and is provided to project from the bottom face of concave container 110a (i.e. the upper face of bottom face part 111) to the interior of container 110a in housing 110.

In container 110a, contact point parts 133 are arranged in positions matching the pads of camera module 200 that is accommodated in container 110a, and move in the insertion direction of camera module 200 by deformation of arms 131.

That is, contact point parts 133 are arranged in a state where contact point parts 133 are urged in the direction (i.e. removal direction) against the insertion direction, thereby making the insertion direction of camera module 200 and the direction in which contact point parts 133 are pressed the same direction. Therefore, when camera module 200 is inserted in container 110a and is pressed in the insertion direction, contact point parts 133 contact the pads of camera module 200 pressing against each other.

Further, in part of the upper end (the upper end of surrounding wall part 112) of housing 110, groove part 115 is formed in which key 216 of camera module 200 that is attached is inserted. By this means, it is possible to make the orientation of housing 110 match with the orientation of camera module 200 that is accommodated in container 110a of housing 110, and connect contacts 130 with corresponding pads.

Further, in part of the upper end of housing 110, positioning projection part 116 that projects upward is provided. When shield cover 120 is attached to housing 110 by covering housing 110, this positioning projection part 116 fits in positioning hole 126 formed in the top shield part (i.e. upper face part) 125 of shield cover 120. By this means, shield cover 120 that is attached to housing 110 is positioned.

Shield cover 120 shown in FIG. 3 is attached to housing 110 that accommodates camera module 200, by covering housing 110 from the opening side (that is, from above), and retains camera module 200 in combination with housing 110. At this time, contacts 130 of housing 110 are retained electrically connected with the pads of camera module 200.

Shield cover 120 has: top shield part 125 that is made by processing a sheet metal and that covers housing 110 from above; and square tube side shield part 122 that hangs down from the outer rim of top shield part 125 and that covers the outer face of surrounding wall part 112 of housing 110.

Top shield part 125 is formed by providing opening part 127 matching the outer shape (here, circular shape) of lens unit 220 of camera module 200, in the center portion of a rectangular plate body having the outer shape matching the outer shape of housing 110.

By this means, when shield cover 120 is attached to housing 110 that accommodates camera module 200, top shield part 125 is arranged facing the part surrounding lens unit 220 (i.e. upper face 211 of module body 210) in a state where the upper portion of lens unit 220 is inserted through opening part 127, and presses against this facing part.

To be more specific, mainly four corner parts 125a of top shield part 125 surrounding opening part 127 press against upper face 211 of module body 210 surrounding lens unit 220.

This top shield part 125 is formed such that the distance between top shield part 125 and bottom face part 111, which defines the height of container 110a when shield cover 120 is attached to housing 110, becomes virtually equal to the height of module body 210 of camera module 200.

In connector 100, camera module 200 is attached by inserting camera module 200 in container 110a of housing 110 from the opening side (here, from above) and attaching shield cover 120 to housing 110 removably.

In connector 100, camera module 200 accommodated in housing 110 is retained by contacts 130 (i.e. arms 131 and contact point parts 133) projecting from bottom face part 111 of housing 110, and by the upper face part around opening part 127 of top shield part 125.

Figure 7:
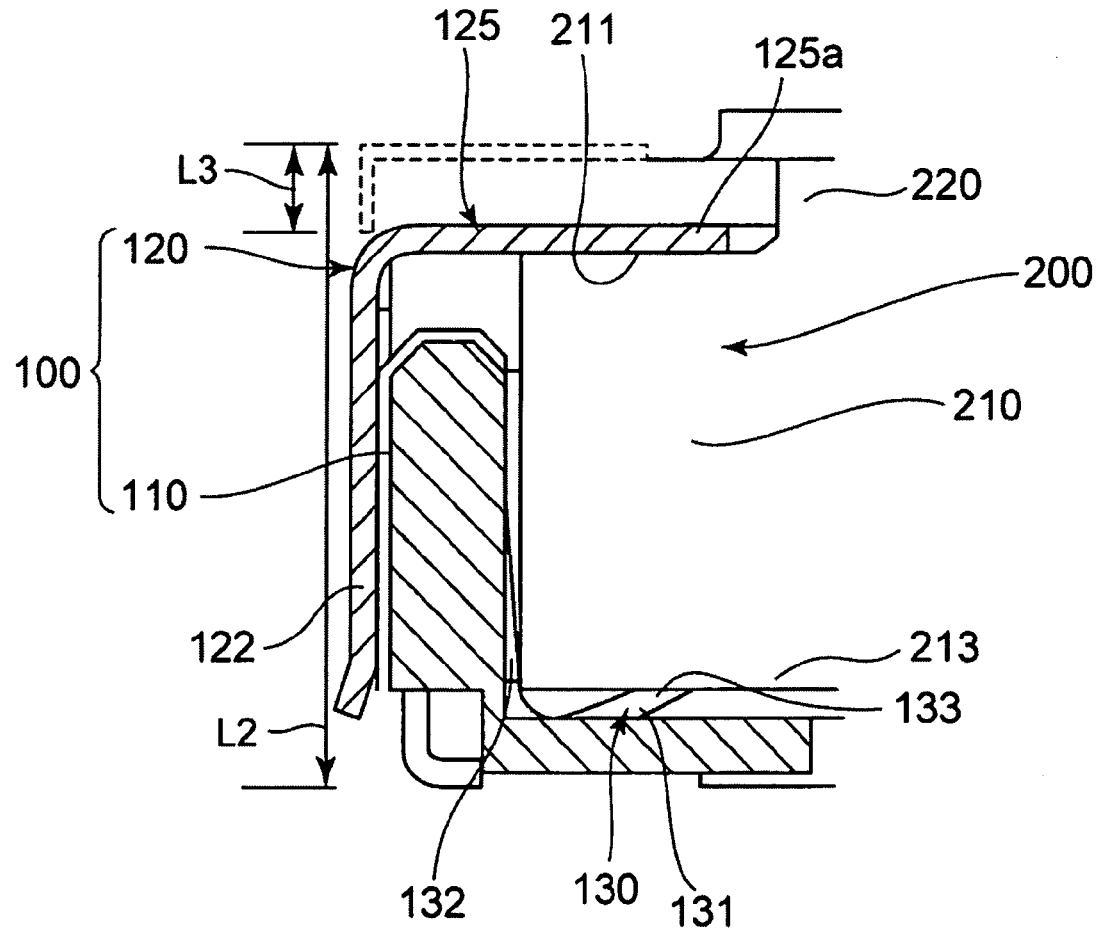
FIG. 7 is a cross-sectional view showing main parts in a state where the camera module is mounted on the module connector according to the present invention.

FIG. 7 is a cross-sectional view showing main parts in a state where the camera module is attached to the camera module connector according to the present invention.

As shown in FIG. 7, in connector 100, shield cover 120 is attached to housing 110 that accommodates camera module 200 in container 110a.

At this time, mainly the lower faces of corner parts 125a of top shield part 125 of shield cover 120 abut on the upper face of camera module 200 (upper face 211 of module body 210) that is urged upward by contacts 130.

That is, with connector 100, when shield cover 120 is attached to housing 110 by engaging attaching holes 124 with engaging projections 114, top shield part 125 abuts on camera module 200 that is urged in the direction against the attaching direction, by contacts 130 that contact camera module 200 on the bottom face side. By this means, top shield part 125 is fixed to housing 110 in a state where camera module 200 is pressed toward the contact 130 side. Here, a plurality of contacts 130 disposed in housing 110 are arranged regularly along the outer rim of the bottom face of camera module 200 to contact a plurality of corresponding pads of camera module 200 in a balanced manner. In this state, camera module 200 is pressed toward bottom face part 111 of housing 110, from above by corner parts 125a of planar top shield part 125 that is orthogonal to the insertion direction.

In this way, connector 100 sandwiches camera module 200 in an electrically connected state by means of top shield part 125 and contacts 130 projecting from bottom face part 111 of housing 110.

In other words, shield cover 120 is detachably attached to housing 110 covering container 110a, and abuts on upper face 211 of camera module 200 (to be more specific, module body 210) that is urged in the direction opposite to the insertion direction by arms 131 of contacts 130.

That is, contacts 130 disposed in housing 110 are provided with a function for retaining camera module 200 so that contacts 130 and shield cover 120 covering housing 110, retain camera module 200. Consequently, it is not necessary to separately provide members, such as conventional spring hooks for preventing the camera module that is accommodated, from falling.

Figure 1:
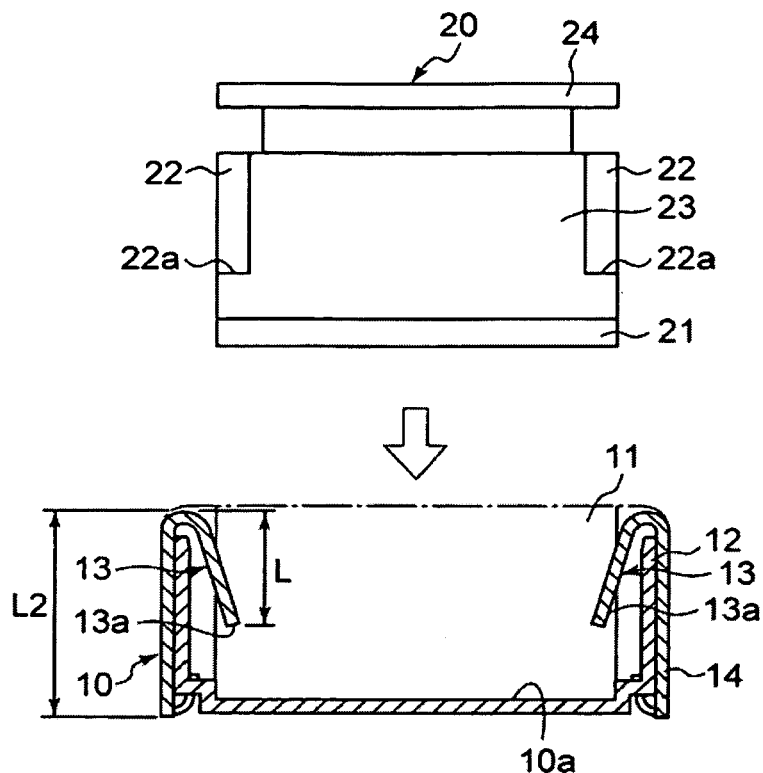
FIG. 1 illustrates a conventional connector.
Figure 2:
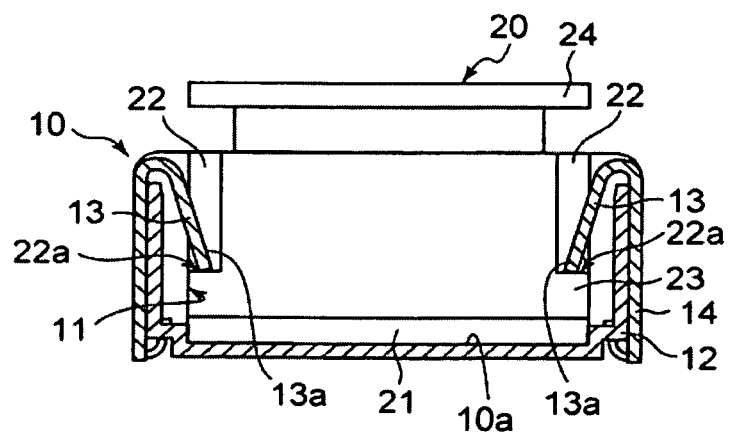
FIG. 2 illustrates a conventional connector.

Consequently, apart from the conventional connectors shown in FIG. 1 and FIG. 2, with the connector according to the present invention, it is not necessary to secure the height corresponding to L2 for the connector to keep the restoring force of spring hooks that project downward to the interior from the upper end side of sidewall parts of the connector body and that prevent the camera module in the container from falling, so that it is possible to make the connector in lower profile. Here, it is possible to reduce the height of the connector corresponding to the length L3, reduce the space for mounting the substrate on which the connector, to which camera module 200 is attached, is mounted, and miniaturize the electronic device having the substrate on which the connector is mounted. For example, connector 100 makes it possible to make the height from the bottom face to upper face 128 of top shield part 125 (see FIG. 3), about 2 millimeter or less to match with the height of the camera module.

As described above, connector 100 according to the present embodiment accommodates a miniaturized camera module, reliably fixes the camera module and makes the connector itself in lower profile.

Further, the above present invention can be variously modified without departing from the spirit of the present invention, and it naturally follows that the present invention covers such modifications.

INDUSTRIAL APPLICABILITY

The module connector according to the present invention provides advantages of accommodating a miniaturized module and reliably fixing the module in an electrically connected state, and making the connector in lower profile, and is useful as a camera module connector that is used when a camera module is mounted in portable devices.

REFERENCE SIGNS LIST

100 Camera Module Connector
110 Housing
110a Accommodating Part
111 Bottom Face Part
114 Engaging Projection
115 Groove Part
120 Shield Cover
122a Sidewall Part
124 Attaching Hole
125 Top Shield Part
125a Corner Part
127 Opening Part
130 Contact
131 Arm
133 Contact Point Part
200 Camera Module
210 Module Body
211 Upper Face
220 Lens Unit

The invention claimed is:

1. A module connector comprising:
a housing comprising:
a bottom face;
a concave container which accommodates a module comprising a key and that is inserted directing the bottom face to the housing;
an upper part;
a plurality of planar contact parts being disposed in the bottom face;
a positioning projection part formed on the upper part; and
a groove formed to couple with the key when the module is inserted into the housing, the groove is formed on and through the upper part so that the key, when inserted into the groove, passes through the upper part;
a contact that provides a contact point part which contacts the planar contact part, with a tip of an arm part, the arm part being elastically deformable and projecting toward the concave container from a bottom face of the concave container; and
a shield cover that is attached detachably to the housing and that abuts on the upper face of the module urged in a direction opposite to an insertion direction by means of elastic deformation of the arm part of the contact, to sandwich the module in combination with the contact, wherein the shield cover comprises an upper face part.

2. The module connector according to claim 1, wherein:
the module comprises a camera module that provides a lens unit with an imaging hole in an upper face of the camera module; and
the upper face part in which an opening part that allows the lens unit to be inserted through is formed, and makes part around the opening part of the upper face part abut on the upper face of the module.

3. The module connector according to claim 1, wherein:
the shield cover further comprises a positioning hole and a second hole cut through the upper face part;
the positioning hole and the second hole are cut into and through opposite edges of the upper face part; and
the positioning projection part fits into the positioning hole.

4. A module connector comprising:
a housing comprising:
a concave container that accommodates a module inserted by directing a bottom face of the module to the housing; and
a plurality of planar contact parts being disposed in the bottom face of the module;
a contact comprising:
an arm; and
a contact point part that contacts the planar contact part, wherein:
the arm is elastically deformable and projects toward the concave container from a bottom face of the concave container, and
the contact point part is formed at a tip of the arm and swingable in an insertion direction of the module by elastic deformation of the arm; and
a shield cover that is detachably attached to the housing to cover the concave container and that abuts on an upper face of the module and thereby urged in a direction opposite to the insertion direction by means of the elastic deformation of the arm of the contact to sandwich the module in combination with the contact, wherein:
engaging projections that engage with attaching holes of sidewall parts of the shield cover when the shield cover is attached, are formed in an outer face of a surrounding wall part of the housing,
the engaging projections are tapered such that tapers are spaced apart from the outer face of the surrounding wall part downward from above,
the housing has a rectangular box shape defining the concave container by a rectangular bottom face part and a surrounding wall part that rises from an outer rim of the bottom face part,
the arm is bent upward, in a shape of letter V, from a front end of an extending part that extends from an end part on an opening side to the bottom face part along an inner wall of the surrounding wall part,
a positioning projection part that projects upward is formed on a top end of the surrounding wall part,
the positioning projection part fits in a positioning hole formed in a top shield part of the shield cover,
the shield cover comprises the top shield part that covers the housing from above and a side shield part that is a square tube and hangs down from an outer rim of the top shield part and covers an outer face of the surrounding wall part of the housing, and
the top shield part is formed such that a distance between the top shield part and the bottom face part, which defines a height of the container, is substantially equal to a height of a module body of the module when the shield cover is attached to the housing.

5. The module connector according to claim 4, wherein
the module comprising a key; and
the housing further comprises a groove formed to couple with the key when the module is inserted into the housing, the groove is formed on and through the top end of the surrounding wall part and opposite to the positioning projection part so that the key, when inserted into the groove, passes through the upper part.

\* \* \* \* \*